(12) United States Patent
Stubbs

(10) Patent No.: US 11,858,401 B2
(45) Date of Patent: Jan. 2, 2024

(54) ELECTRICALLY DRIVEN DUMP SYSTEM

(71) Applicant: Rustee Stubbs, Williston, ND (US)

(72) Inventor: Rustee Stubbs, Williston, ND (US)

( * ) Notice: Subject to any disclaimer, the term of this patent is extended or adjusted under 35 U.S.C. 154(b) by 94 days.

(21) Appl. No.: 17/201,997

(22) Filed: Mar. 15, 2021

(65) Prior Publication Data

US 2021/0284055 A1    Sep. 16, 2021

Related U.S. Application Data

(60) Provisional application No. 62/989,348, filed on Mar. 13, 2020.

(51) Int. Cl.
*B60P 1/16* (2006.01)
*H02P 27/06* (2006.01)
*H02M 3/04* (2006.01)
*F15B 15/20* (2006.01)
*B60R 16/03* (2006.01)

(52) U.S. Cl.
CPC ............. *B60P 1/162* (2013.01); *B60P 1/165* (2013.01); *B60R 16/03* (2013.01); *F15B 15/20* (2013.01); *H02M 3/04* (2013.01); *H02P 27/06* (2013.01)

(58) Field of Classification Search
None
See application file for complete search history.

(56) References Cited

U.S. PATENT DOCUMENTS

| 5,398,506 A * | 3/1995 | Martin | F04B 49/02 |
| | | | 417/316 |
| 2009/0132116 A1 | 5/2009 | Tanaka et al. | |
| 2010/0051359 A1 | 3/2010 | Fushiki et al. | |
| 2014/0265560 A1* | 9/2014 | Leehey | B60L 58/13 |
| | | | 307/10.1 |
| 2015/0032301 A1* | 1/2015 | Lamba | B60L 58/20 |
| | | | 701/19 |
| 2015/0352944 A1* | 12/2015 | Hoffmann | F01P 5/04 |
| | | | 180/65.21 |
| 2018/0225895 A1* | 8/2018 | Oda | G07C 5/008 |
| 2019/0001782 A1 | 1/2019 | Anderson et al. | |
| 2020/0039339 A1 | 2/2020 | Naya et al. | |
| 2020/0086712 A1* | 3/2020 | Schumacher | H02J 1/14 |
| 2020/0086744 A1* | 3/2020 | Schumacher | B60L 58/22 |
| 2020/0211300 A1* | 7/2020 | Helms | H04Q 9/00 |
| 2020/0262325 A1* | 8/2020 | Karg | B60P 1/36 |
| 2020/0298713 A1* | 9/2020 | Baumann | B60R 16/0238 |
| 2020/0399856 A1* | 12/2020 | Watanabe | H02J 7/00 |
| 2021/0394659 A1* | 12/2021 | Uetake | B62D 33/027 |

* cited by examiner

*Primary Examiner* — Daniel Kessie
*Assistant Examiner* — Terrence R Willoughby
(74) *Attorney, Agent, or Firm* — Gurr Brande & Spendlove, PLLC; Robert A. Gurr

(57) ABSTRACT

A system for electrically powering a semi-trailer dump system includes a DC-to-DC voltage converter configured to receive input DC voltage from a battery bank and output increased DC voltage, an energy storage element configured to receive the increased DC voltage from the DC-to-DC voltage converter, a controller configured to receive DC power from the energy storage element and convert the DC power into AC power, and a motor configured to receive AC power from the controller, the motor being mechanically connectable to a pump for controlling the dumping system.

12 Claims, 7 Drawing Sheets

ELECTRICALLY DRIVEN DUMP SYSTEM

CROSS-REFERENCE TO RELATED APPLICATIONS

This application claims the benefit of U.S. Provisional Application Ser. No. 62/989,348, filed on Mar. 13, 2020, which is incorporated herein by reference.

TECHNICAL FIELD

The present disclosure relates to an electrically driven dump system. More particularly, the present disclosure is directed to an electric dump system that can be remotely controlled through a controller.

BACKGROUND

Transportation companies commonly use semi-trailer trucks (more commonly referred to as "semi-trucks" or simply "semis") to transport freight or other materials. Often, semi-trucks transport loose materials (e.g., gravel, dirt, sand, rocks/boulders, demolition waste, wet materials) that will be dumped at the delivery site. Accordingly, semi-trucks often pull semi-trailers with dump systems for dumping transported materials at the delivery site.

Conventionally, dump systems for dumping materials at a delivery site are driven by a wet kit connected to a power takeoff (PTO) that is mechanically connected to the semi-truck's transmission to selectively transfer power from the semi-truck's running engine to the dump system. However, conventional semi-truck and trailer dump systems suffer from numerous shortcomings.

Initially, the functioning of conventional semi-truck and trailer dump systems are often controlled by input receivers that are wired to the dump system (e.g., a switch or button inside of the semi-truck cab). This arrangement prevents operators from being able to move freely while operating a semi-trailer dump, which may prevent the operator from obtaining different vantage points to be able to ensure a safe dump or abort the dump if needed.

Additionally, in a wet kit system, the PTO drives a hydraulic pump that connects to a hydraulic tank for actuating the dump system. Accordingly, the hydraulic pump must be positioned proximate to the PTO, necessitating long hydraulic lines that extend from the semi-truck-mounted hydraulic pump to the semi-trailer-mounted hydraulic tank. The hydraulic pumps of wet kit systems are nontrivial to install/implement onto a semi-truck, which constrains the interoperability of semi-trailer dump systems with semi-trucks.

The long hydraulic lines of wet kit systems are prone to hydraulic leaks, necessitating excessive diagnostics and repairs. Additionally, hydraulic lines in wet kit systems are known to rupture when exposed to extreme and/or quickly changing temperatures. Furthermore, when a hydraulic line ruptures, approximately 5 gallons of fluid spills, which further causes freight companies to incur cleanup expenses in addition to repair/replacement expenses.

Additionally, the performance of the hydraulic pumps and hydraulic motors of wet kit systems is typically affected by the temperature in which the system runs, which can cause system failures. Wet kits typically have a limited-service life by reason of their complexity, user error, susceptibility to weather conditions, and deficiencies in the design.

Accordingly, there are number of disadvantages with wet-kit semi-truck dump systems that can be addressed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Implementations of the present disclosure solve one or more of the foregoing or other problems in the art with semi-trailer dump systems. In particular, one or more implementations can include a DC-to-DC voltage converter configured to receive input DC voltage from a battery bank and output increased DC voltage, an energy storage element configured to receive the increased DC voltage from the DC-to-DC voltage converter, a controller configured to receive DC power from the energy storage element and convert the DC power into AC power, and a motor configured to receive AC power from the controller, the motor being mechanically connectable to a pump. As used herein, AC refers to Alternating Current and DC refers to Direct Current.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which.

DETAILED DESCRIPTION

Figure 1:
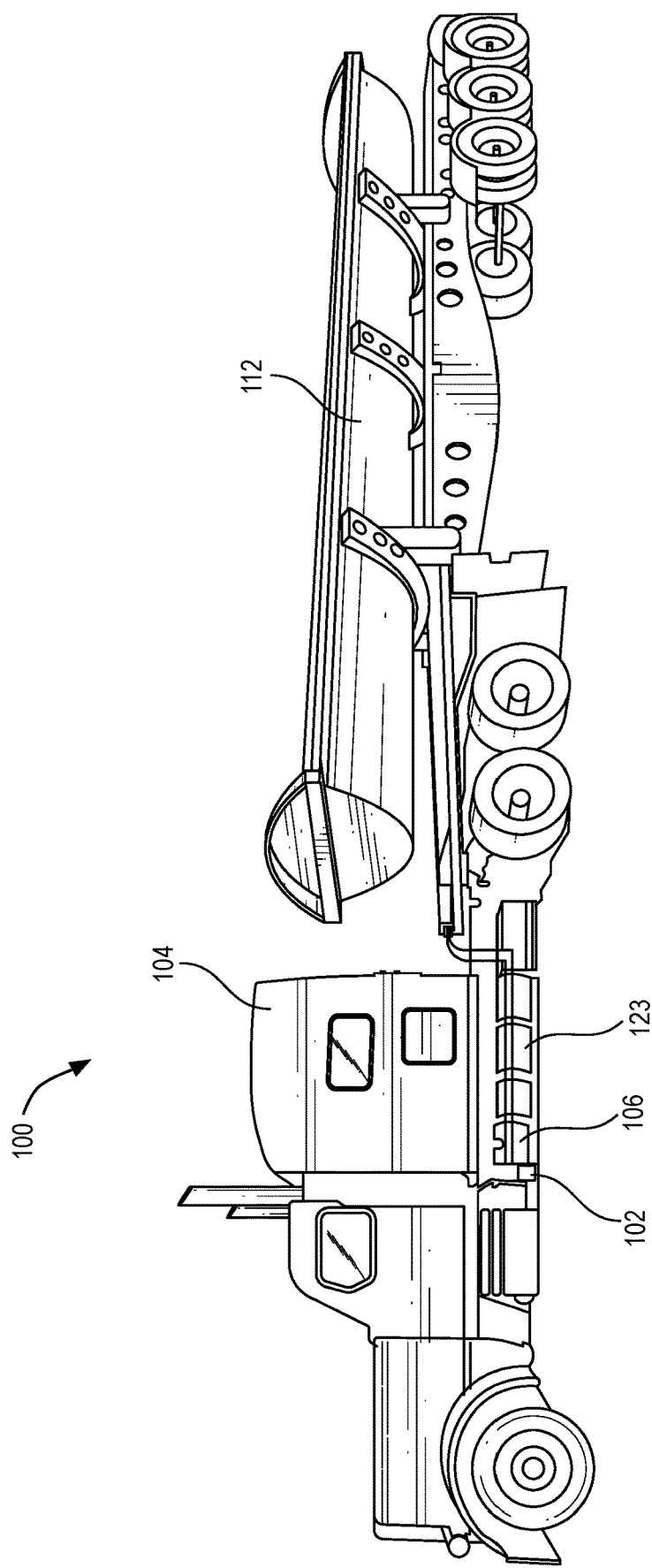
FIG. 1 illustrates a conceptual representation of semi-truck-mounted components of an electrically driven dump system.

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, any headings used herein are for organizational purposes only, and the terminology used herein is for the purpose of describing the embodiments. Neither are not meant to be used to limit the scope of the description or the claims.

Disclosed embodiments are directed to electrically driven dump systems. Some embodiments include a DC-to-DC voltage converter configured to receive input DC voltage from a battery bank and output increased DC voltage, an energy storage element configured to receive the increased DC voltage from the DC-to-DC voltage converter, a controller configured to receive DC power from the energy storage element and convert the DC power into AC power, and a motor configured to receive AC power from the controller, the motor being mechanically connectable to a pump.

In some embodiments, the battery bank is a battery bank of an electrical system of a semi-truck, and the battery bank is chargeable by an alternator of the semi-truck. Furthermore, in some embodiments, the controller is configured to wirelessly communicate with an input device, and the input device is configured to receive user input to selectively activate or deactivate the motor or change a directional switch.

Those skilled in the art will recognize that the disclosed embodiments may address many of the problems associated with semi-trailer dump systems. For instance, disclosed embodiments may provide power to a semi-trailer-mounted dump system from an electrical system of a semi-truck rather than a power takeoff (PTO). Accordingly, the presently disclosed electrically driven dump systems may be more easily connectable to most or all semi-trucks, regardless of whether the semi-trucks have a PTO and/or wet kit system.

Additionally, because the pump need not be in mechanical communication with a PTO, the pump may be mounted directly to the semi-trailer proximate to the hydraulic tank for actuating the dump system. As such, the presently disclosed embodiments may avoid long hydraulic lines, which may reduce the incidence of hydraulic leaks by up to 80%, thereby avoiding costs to transportation companies.

Furthermore, in at least some embodiments, the functioning of the presently disclosed electrically driven dump system may be controlled wirelessly, allowing operators to move freely while operating the dump system. Allowing operators to move freely may allow operators to reach different vantage points while executing a dump and may allow users to more easily see conditions that would warrant aborting a dump.

In view of the foregoing, the disclosed embodiments may allow freight/transportation companies to avoid considerable costs associated with maintaining and operating wet kit-driven dump systems.

Having just described some of the various benefits and high-level attributes of the disclosed embodiments, additional detail will be provided with reference to FIGS. 1-4, which show various examples, schematics, conceptualizations, and/or supporting illustrations associated with the disclosed embodiments.

FIG. 1 illustrates a conceptual representation of semi-truck-mounted components of an electrically driven dump system 100. In particular, a system for electrically driving a dump system includes a voltage converter 102, which is illustrated in FIG. 1 as being mounted on a lower portion of the driver's side of a semi-truck 104 near the driver's-side step. However, it will be appreciated that the voltage converter 102 may be mounted on at different locations of the semi-truck 104, such as on a lower portion of the passenger's side of the semi-truck 104 near the passenger's-side step, on or near the catwalk, or other location. In many semi-trucks, the driver's side step houses a battery bank that provides DC power to the electrical systems of the semi-truck 104. The semi-truck battery bank 106 is typically charged and/or chargeable by an alternator of the semi-truck 104.

The voltage converter 102 shown in FIG. 1 is a DC-to-DC voltage converter that is configured to receive input DC voltage from the battery bank 106 of the semi-truck and output increased DC voltage. Any suitable architecture for converting an input DC voltage to an increased output DC voltage is within the scope of this disclosure, such as, but not limited to, one or more (or combinations of) switch-mode circuits (magnetic or capacitive (e.g., charge pumps)), capacitive voltage multipliers, Dickson multiplier circuits, redox flow batteries, motor-generators, etc.

In some embodiments, the voltage converter 102 contains a suitable architecture for increasing input DC voltage (e.g., 12V input DC voltage from the battery bank of the semi-truck) to a DC voltage within a range of 48V to 400V. In a particular embodiment, the voltage converter 102 receives 12V (or approximately 12V) input DC voltage and outputs DC voltage within a range of 140V to 160V. Increasing the DC voltage as noted may provide the voltage necessary to power other components of the system for electrically driving a dump system, as described herein.

Figure 2:
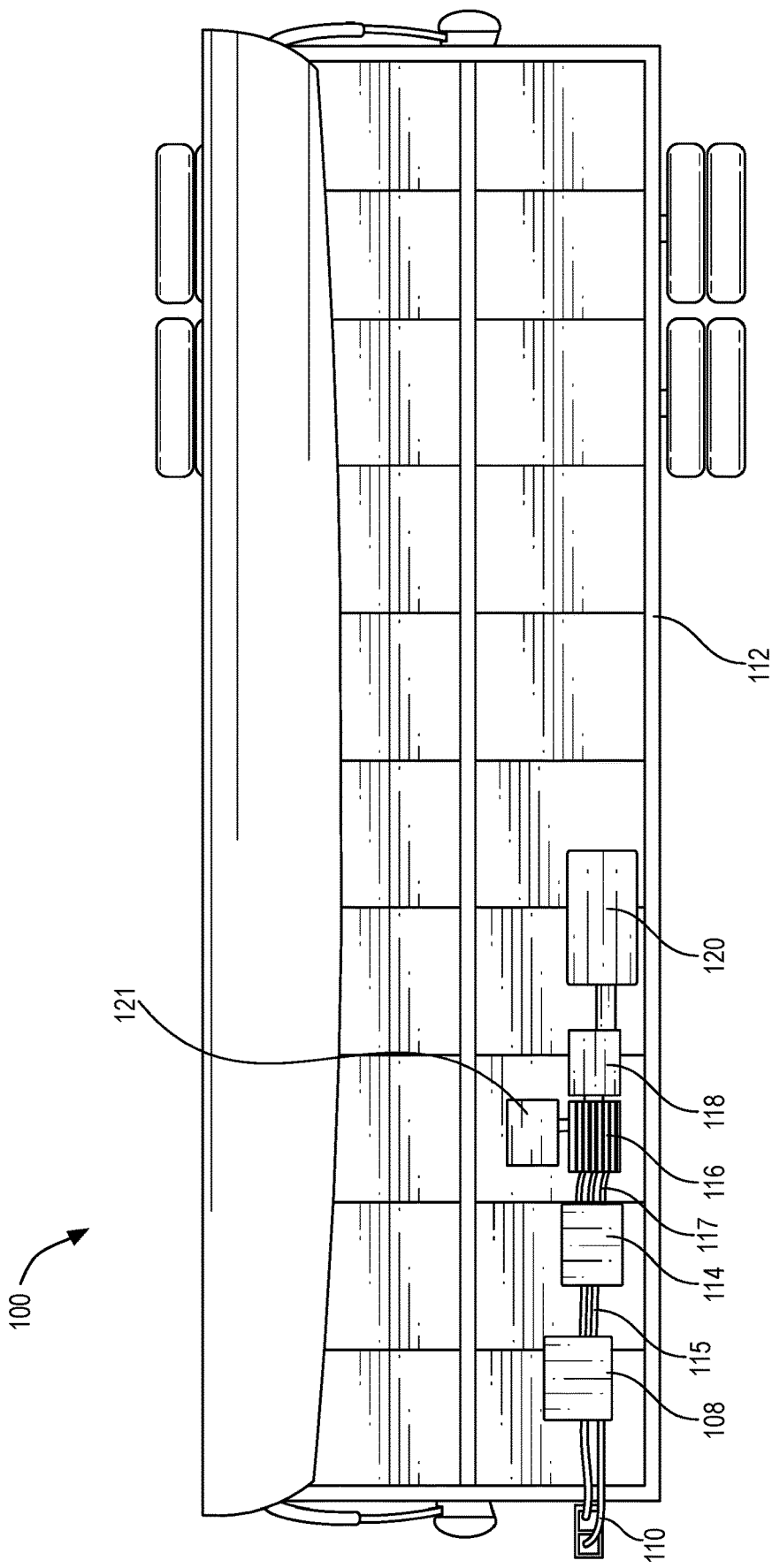
FIG. 2 illustrates a conceptual representation of semi-trailer-mounted components of an electrically driven dump system.

FIG. 2 illustrates a conceptual representation of semi-trailer-mounted components of an electrically driven dump system 100. The voltage converter 102 described with reference to FIG. 1 may be configured to provide increased DC voltage (e.g., 144V DC) to an energy storage element 108 (e.g., Ion/Super Capacitor) in FIG. 2) via wired connections, such as cables 110, with the energy storage element 108. In this manner, in some implementations, the increased DC voltage provided from the voltage converter 102 may charge the energy storage element 108. In some embodiments, the energy storage element 108 may be mounted to a dump system 112 (e.g., a semi-trailer side dump) of the semi-truck 104.

Those skilled in the art will recognize that the depiction of the energy storage element 108 in FIG. 2 is illustrative only, and non-limiting. In some instances, the energy storage element 108 is implemented as a second battery bank (e.g., in addition to the alternator-charged battery bank of the semi-truck). Also, the energy storage element 108 may be implemented, for example, as one or more lead-acid batteries, nickel-cadmium batteries, nickel-metal hydride batteries, lithium-ion batteries, lithium-ion polymer batteries, flow batteries, capacitors (e.g., supercapacitors, lithium-ion capacitors), and/or even superconducting magnetics.

Being charged/chargeable by the voltage converter 102, the energy storage element 108 may then provide DC power via energy storage cables 115 to a controller 114 (shown in FIG. 2). In some embodiments, the controller 114 is configured to convert the received DC power into AC power (e.g., an inverter) and provide the AC power to a motor 116 via controller cables 117. It will be appreciated that any suitable architecture for converting DC power into AC power is within the scope of this disclosure, such as a power inverter, motor-generator, rotary converter, etc.

In some embodiments, the controller 114 is configured to provide three-phase AC power, and the motor 116 is implemented as a three-phase, water-cooled, permanent magnet motor (e.g., to maintain a high peak voltage). However, other motors may be used. By way of non-limiting example, the motor 116 may be embodied as any type of induction motor (polyphase cage or wound rotor, two-phase servo motor, single-phase induction motor), synchronous motor (polyphase synchronous motor, single-phase synchronous motor, hysteresis synchronous motor, reluctance motor, permanent-magnet motor, DC-excited motor), universal motor, series wound motor, repulsion motor, exterior rotor, sliding rotor motor, electronically commutated motor, watthour-meter motor, and/or slow-speed synchronous timing motor.

The motor 116 may be mechanically connected to a hydraulic pump 118 that is connected to a hydraulic tank 120. In at least some implementations, the hydraulic tank 120 is connected to the dump system 112 such that operating the hydraulic pump 118 actuates the dump system 112 between an upright position (FIG. 1 shows the dump system in the upright position) and a dumping position (FIG. 2 shows the dump system in the dumping position). It will be appreciated that any type of hydraulic pump is within the scope of this disclosure, such as, but not limited to, gear pumps, rotary vane pumps, screw pumps, bent axis pumps, inline axial piston pumps, radial piston pumps, peristaltic pumps, etc.

Thus, in at least some of the disclosed embodiments, the voltage converter 102 (DC-to-DC) connected to the battery bank 106 of the semi-truck 104 outputs increased DC voltage and provides the increased DC voltage to the energy storage element 108 (e.g., an ion/super capacitor). The energy storage element 108 provides DC power to the controller 114 that converts the received DC power into AC power and provides AC power to the motor 116. The motor 116 drives the hydraulic pump 118 connected to the hydraulic tank 120 to actuate the dump system 112 (e.g., a semi-trailer-mounted side dump).

In this regard, at least some disclosed embodiments provide a system for electrically driving a dump system on a semi-trailer with an existing electrical system of a semi-truck, thereby eliminating the need to power the dump system 112 with a PTO and wet kit combination and eliminating all maintenance, breakdown, monitoring, and/or leak problems associated with the use of a wet kit to power a dump system.

FIGS. 1 and 2 have depicted certain components of the presently disclosed systems for electrically driving a dump system as mounted on either a semi-truck 104 or a semi-trailer 112. However, it will be appreciated that the arrangements depicted in FIGS. 1 and 2 are illustrative only, and non-limiting. For example, the voltage converter 102 may be mounted on the semi-trailer 112 (or other vehicle) proximate to the energy storage element 108, or, alternatively, the energy storage element 108 and/or controller 114 may be mounted on the semi-truck 104 proximate to the voltage converter 102.

Additionally, it will be appreciated that FIGS. 1 and 2 show conceptual representations of the components of the presently disclosed systems for electrically driving a dump system, and, therefore, any depicted positioning/placement of components on a semi-trailer or semi-truck are illustrative only and non-limiting. For instance, although FIG. 1 shows a voltage converter mounted proximate to the driver's side step, it will be recognized that a voltage converter may be mounted on the catwalk of the semi-truck, within the cab of the semi-truck, or even on the semi-trailer as mentioned above.

It should also be noted that the presently disclosed systems for electrically driving a dump system may include components not explicitly shown in FIGS. 1 and 2. For example, as will be described in more detail hereafter, a system for electrically driving a dump system may include or be in communication with one or more computing systems and/or sensors to facilitate the operation and/or monitoring of the system and/or components thereof. In another example, a motor of a system for electrically driving a dump system may include one or more cooling systems 121 for cooling the motor 116, such as a semi-trailer-mounted radiator and fan system in fluid communication with the motor. In yet another example, the voltage converter may provide increased DC voltage to the energy storing element 108 through a charge controller 123 (e.g., a DC regulator). Additionally, the presently disclosed systems may include a directional switch, such as a directional valve, associated with the hydraulic components of the system (e.g., the hydraulic tank, the hydraulic motor), allowing the motor 116 to operate in a single rotational direction and yet drive the dump system between load and unload positions.

As mentioned, the systems for electrically driving a dump system 100 disclosed herein provide DC power at various points, such as from the battery bank 106 of the semi-truck 104, from the voltage converter 102, or from the energy storage 108. Accordingly, the presently disclosed systems for electrically driving a dump system 100 may provide power to one or more wireless communication systems that are configured to wirelessly communicate with one or more input devices.

Figure 3:
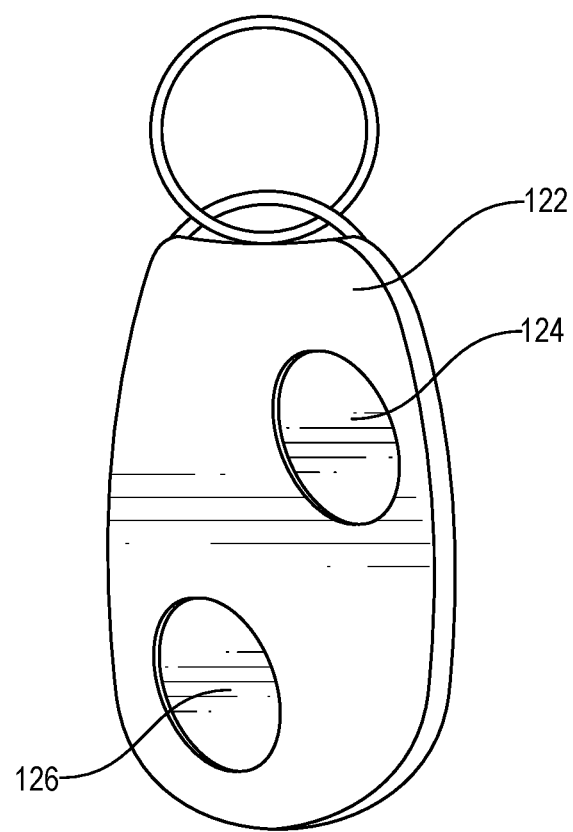
FIG. 3 illustrates an example embodiment of an input device for receiving user input to control the dump system.

FIG. 3 illustrates an example representation of an input device 122 (e.g., Remote Control Module) for sending user input to control the dump system 112. As shown, the input device 122 includes an unload switch 124 and a load switch 126. Receiving operator input engaging the different switches may cause the input device 122 to send different signals to one or more wireless communication systems (e.g., wireless transceivers, radio transmitters, etc.) that are in communication with (or are integrated into) the system for electrically driving a dump system (e.g., integrated into the controller). The different signals may cause the dump system 112 to actuate between a load position (when the load switch 126 is pressed) and an unload position (when the unload switch 124 is pressed). By way of non-limiting example, the signal output by the input device 122 when the load switch 126 is triggered may be detected by the wireless communication system(s) (e.g., controller 114) and cause a directional valve of the hydraulic components to switch to or remain in a first direction (e.g., to cause the dump system to actuate in a first direction when the motor 116 rotates), whereas the signal output by the input device 122 when the unload switch 124 is triggered may be detected by the wireless communication system(s) and cause the directional valve of the hydraulic components to switch or remain in a second direction opposite the first direction (e.g., to cause the dump system to actuate in a second direction when the motor 116 rotates). In another non-limiting example, the signal output by the input device 122 when the load switch 126 is pressed may be detected by the wireless communication system(s) and cause the motor 116 to rotate in a first direction (e.g., by modifying a switch position of the motor 116), whereas the signal output by the input device when the unload switch 124 is pressed may be detected by the wireless communication system(s) and cause the motor 116 to rotate in a direction opposite the first direction.

Other functionality not explicitly shown in FIG. 3 may be implemented into the input device 122 for controlling the functioning of the dump system 112 with an electrical driving system. For instance, the input device 122 may include a cancel/abort button/switch which emits a signal that causes the motor 116 to immediately halt. In some implementations, a cancel/abort command may be triggered by pressing the load and/or unload switch while the motor is rotating. In other instances, the wireless communication system(s) only cause the motor to rotate (and thereby actuate the dump system) while a signal is being emitted by the input device, such that the dump system only actuates while an operator holds down or persistently triggers a button/switch of the input device 122. Additionally, it should be noted that the wireless communication system(s) and the input device(s) may communicate via any suitable wireless communication form, such as radio, infrared, Wi-Fi®, Bluetooth®, satellite, etc.

In this regard, the presently disclosed system for electrically driving a dump system may allow wireless control functionality, allowing operators to freely move while issuing commands to control the dump system 112. For example, an operator may move to optimal vantage points to monitor the dumping of a load.

Although FIG. 3 shows a simplified representation of an input device for wirelessly controlling a system for electrically driving a dump system, it will be appreciated that the input device can be implemented in different forms and/or as different devices. For instance, as will be described hereinbelow, the input device may take the form of a mobile computing system that has one or more processors and one or more computer-readable hardware storage media and a user interface, such as an operator's smartphone that presents selectable objects (e.g., buttons) to the user for sending signals to control the functioning of the dump system.

Furthermore, the wireless communication system(s) mentioned above may be implemented as part of an on-board computing system in communication with the system for electrically driving a dump system. The presently disclosed systems for electrically driving a dump system may provide power to one or more on-board computing systems (e.g., electronic control modules (ECMs)) that are implemented as part of the systems for electrically driving a dump system or are in communication with the same. For example, the one or more computing systems may receive DC power from the battery bank 106 of the semi-truck 104 or the energy storage element 108 that powers the controller 114 (e.g., a computing system may be implemented as part of or be in communication with the controller). The computing systems(s) may provide input, monitoring, communication, sensing, notification, and/or safety functionalities that may control and/or protect the system components and/or increase monitoring by administrators (e.g., fleet commanders, freight companies). As mentioned above and as will be described in more detail hereafter, the one or more computing systems may be in communication with one another and/or with outside computing systems, devices, or components (e.g., an input device as described above).

Figure 4:
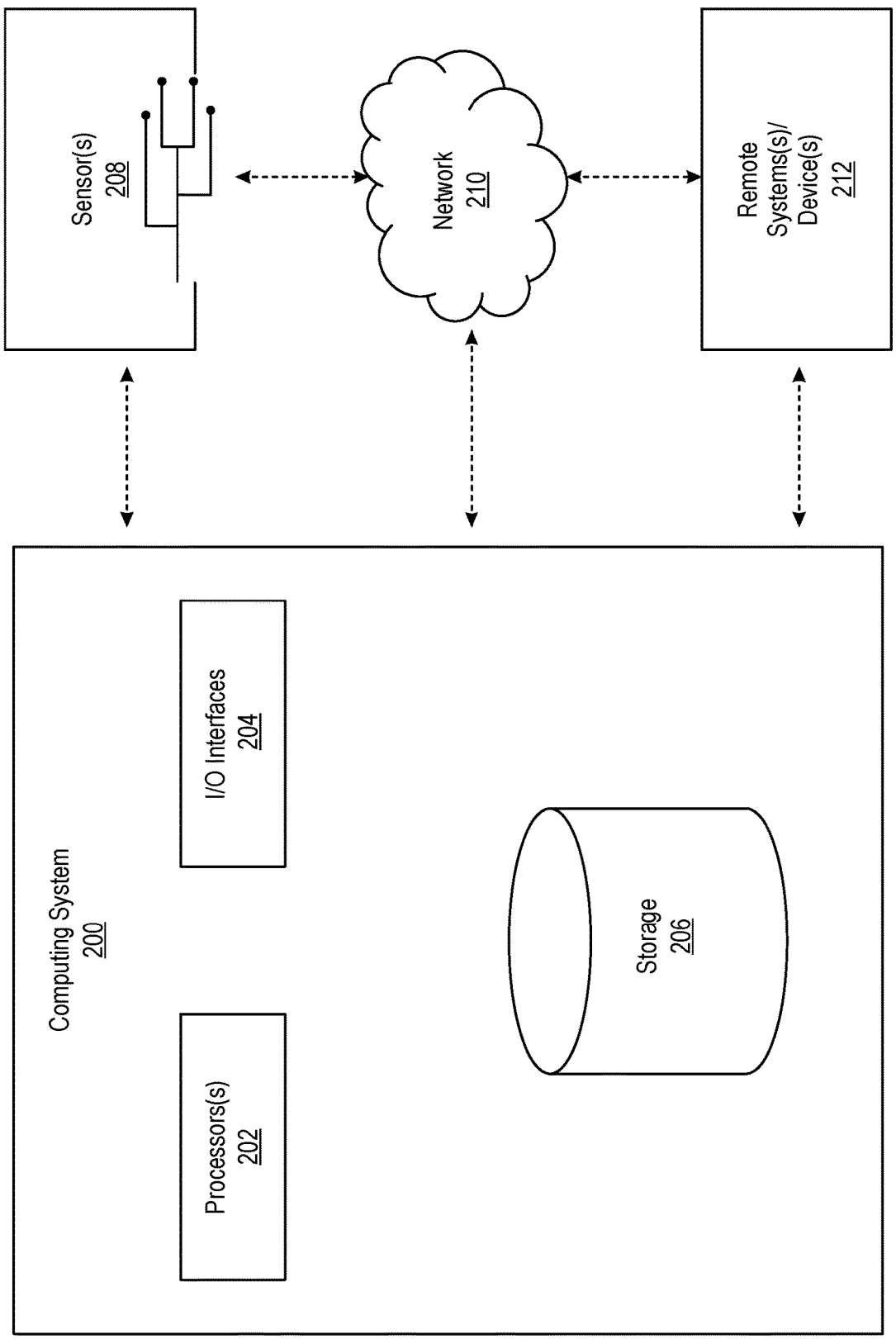
FIG. 4 illustrates a schematic representation of a computing system.

FIG. 4 illustrates a schematic representation of a computing system 200. The computing system 200 may take various forms, such as electronic control modules (ECMs), personal computers, desktop computers, laptop computers, tablets, handheld devices (e.g., mobile phones, PDAs, pagers), microprocessor-based or programmable consumer electronics, minicomputers, mainframe computers, multi-processor systems, network PCs, distributed computing systems, datacenters, message centers, routers, switches, and even devices that conventionally have not been considered a computing system, such as wearables (e.g., glasses, head-mounted displays).

As noted, the computing system 200 may also be a distributed system that includes one or more connected computing components/devices that are in communication. Accordingly, the computing system 200 may be embodied in any form and is not limited to any particular embodiment explicitly shown herein.

In a basic configuration, the computing system 200, as shown in FIG. 4, illustrates a computing system 200 that includes at least one hardware processing unit 202 (aka a "processor"), input/output (I/O) interfaces 204, and storage 206.

The storage 206 may be physical system memory, which may be volatile, non-volatile, or some combination of the two. The term "memory" may also be used herein to refer to non-volatile mass storage such as physical storage media. If the computing system 200 is distributed, the processing, memory, and/or storage capability may be distributed as well. As used herein, the term "executable module," "executable component," or even "component" can refer to software objects, routines, or methods that may be executed on the computing system 200. The different components, modules, engines, and services described herein may be implemented as objects or processors that execute on the computing system 200 (e.g., as separate threads).

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The disclosed embodiments may comprise or utilize a special-purpose or general-purpose computer including computer hardware, such as, for example, one or more processors (such the hardware processing unit 202, which may include one or more central processing units (CPUs), graphics processing units (GPUs) or other processing units) and system memory (such as storage 206). Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media. Processors and storage media may also be combined, such as with microcontrollers.

A "network," like the network 210 shown in FIG. 4, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computing system 200 will include one or more communication channels that are used to communicate with the network 210. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code.

While not all computing systems require a user interface, in some embodiments, a computing system 200 includes, as part of the I/O interfaces 204, a user interface for use in communicating information to/from a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, controllers, projections, holograms, cameras, keyboards, stylus, mouse, or other pointer input, sensors of any type, and so forth. The computing system 200 may perform certain functions in response to detecting certain user input.

The computing system 200 may also be connected (via a wired or wireless connection) to external sensors 208 (e.g., a temperature sensor associated with the motor, an RPM sensor, a pressure sensor associated with the hydraulic pump, battery sensors, or other sensors). It will be appreciated that the external sensors may include sensor systems rather than solely individual sensor apparatuses.

Further, the computing system 200 may also include communication channels allowing the computing system 200 to be in wireless (e.g., Bluetooth®, NFC, satellite, infrared, etc.) or wired communication with any number or combination of sensors 208, networks 210, and/or other remote systems/devices 212. Remote systems/devices 212 may be configured to perform any of the processing described with regard to computing system 200. By way of example, a remote system 212 may include an administrative system that receives sensor readings from the sensors 208.

Those skilled in the art will appreciate that the embodiments may be practiced in network computing environments with many types of computer system configurations. The embodiments may also be practiced in distributed system environments where local and remote computer systems that are linked (either by hardwired data links, wireless data links, or by a combination of hardwired and wireless data links) through a network each perform tasks (e.g., cloud computing, cloud services and the like). In a distributed system environment, program modules may be located in both local and remote memory storage devices.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Additionally, or alternatively, the functionality described herein can be performed, at least in part, by one or more hardware logic components (e.g., the hardware processing unit). For example, and without limitation, illustrative types of hardware logic components that can be used include Field-Programmable Gate Arrays (FPGAs), Application-Specific or Application-Specific Integrated Circuits (ASICs), Application-Specific Standard Products (ASSPs), System-On-A-Chip Systems (SOCs), Complex Programmable Logic Devices (CPLDs), Central Processing Units (CPUs), and other types of programmable hardware.

Having described exemplary components and configurations of a computing system 200, the following describes and/or re-iterates various functionalities that may be facilitated by the computing system 200 or a remote system/device 212 associated with a system for electrically driving a dump system 100 present disclosure.

In some embodiments, the computing system 200 includes computer-executable instructions (e.g., stored on storage 206) that enable the computing system 200 (e.g., by one or more processors 202 executing the computer-executable instructions) to selectively activate or deactivate any portion of the system for electrically driving a dump system, such as the motor 116. Additionally, in some instances, the computing system 200 includes computer-executable instructions that enable the computing system 200 to selectively change the operation of any portion of the system for electrically driving a dump system 100, such as by changing a directional switch of the system (e.g., to change a directional valve of the hydraulic system, comprising the hydraulic pump 118 and the hydraulic tank 120) and/or changing the rotation direction of the motor 116.

In some instances, the computing system 200 selectively activates, deactivates, and/or changes the operation of one or more components of the system for electrically driving a dump system in response to a triggering event, such as receiving user input (e.g., by receiving a wireless signal from a remote, as mentioned above) or detecting a sensor reading that meets or exceeds a predetermined threshold or is outside of a predefined acceptable range. In implementations where the computing system 200 includes or is in communication with a user interface (e.g., whether directly as an I/O interface 204 or as part of a remote system/device 212, such as a mobile device (e.g., smartphone) of a semi-truck operator or fleet administrator), the computing system 200 may receive triggering input (e.g., from an I/O interface 204 or a remote system/device 212) that causes the computing system 200 to selectively activate, deactivate, and/or change the operation of one or more components of the system for electrically driving a dump system (e.g., the motor, a directional switch).

Furthermore, a computing system 200 may cause sensor values detected by the various sensors 208 in communication with the computing system 200 to be displayed on a user display or user interface (e.g., an I/O interface 204 and/or a display of a remote system/device 212). For example, the computing system 200 may cause display of representations of sensor readings (from sensors 208) associated with detected state of charge, DC draw amperage, and/or amp hours associated with the battery bank, load amps of the motor, temperature of the motor, pressure sensor of the hydraulic pump and/or hydraulic tank etc. Displaying one or more sensor readings to a user/administrator may enable a user/administrator to ensure that the system for electrically driving a dump system is operated with due care, so as to avoid damage to the system or other damages caused by improper operation thereof.

In some instances, the computing system 200 is configured to provide a notification on a user/administrator interface in response to detecting that a sensor reading of one or more sensors of the system for electrically driving a dump system has met or exceeded a predetermined threshold value (e.g., an unacceptably high temperature of the motor 116, a low pressure in the hydraulic pump 118 and/or hydraulic tank 120). The notification can take on various forms, such as a visual notification on a screen, a sound, etc. By way of example, by providing notifications when pressure readings for the hydraulic pump 118 and/or hydraulic tank 120 are outside of acceptable ranges, an operator and/or administrator may readily become aware of a leak in the hydraulic system that needs addressing. The notification may be displayed as text on a screen, a light indicator (e.g., LED indicators for various values), etc. In one embodiment, the computing system 200 may provide a notification to an operator's smartphone (via push notifications, text communications, etc.), alerting the operator to issues.

It should be noted that an operator or an administrator may define threshold values that may trigger the display of a notification (or even trigger selective deactivation of one or more system components). For instance, the administrator or operator may define a maximum operational temperature for the motor 116, a minimum state of charge for the battery bank 106, a maximum draw from the battery bank 106, a maximum starting load for the motor 116, and/or a minimum operational pressure for the hydraulic pump 118 and/or hydraulic tank 120. In this way, freight company administrators and/or fleet commanders may ensure optimal operation of systems for electrically driving a dump system to extend the economic life of such systems.

Figure 5:
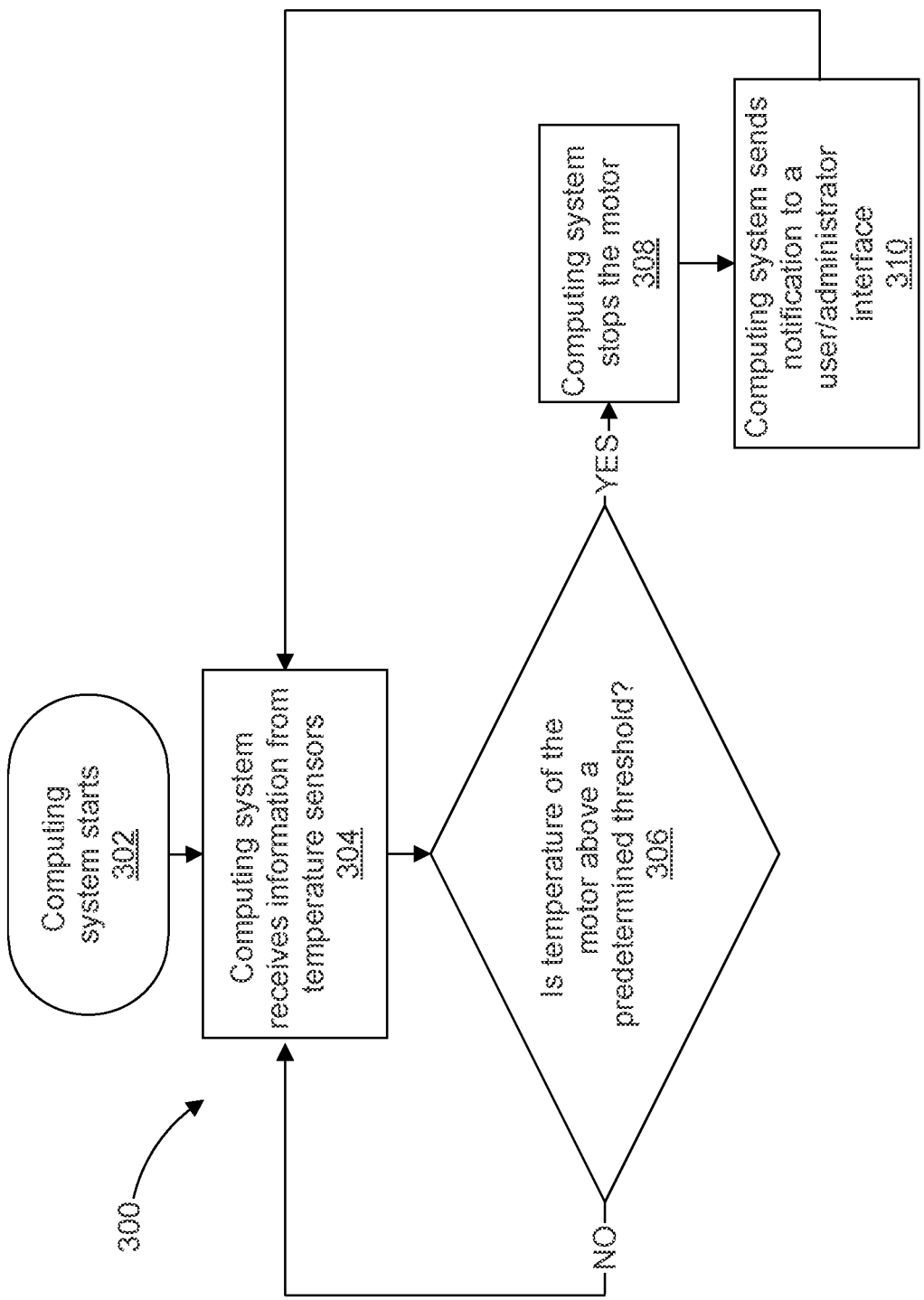
FIG. 5 illustrates a flowchart of temperature regulation of an electrically driven dump system.
Figure 6:
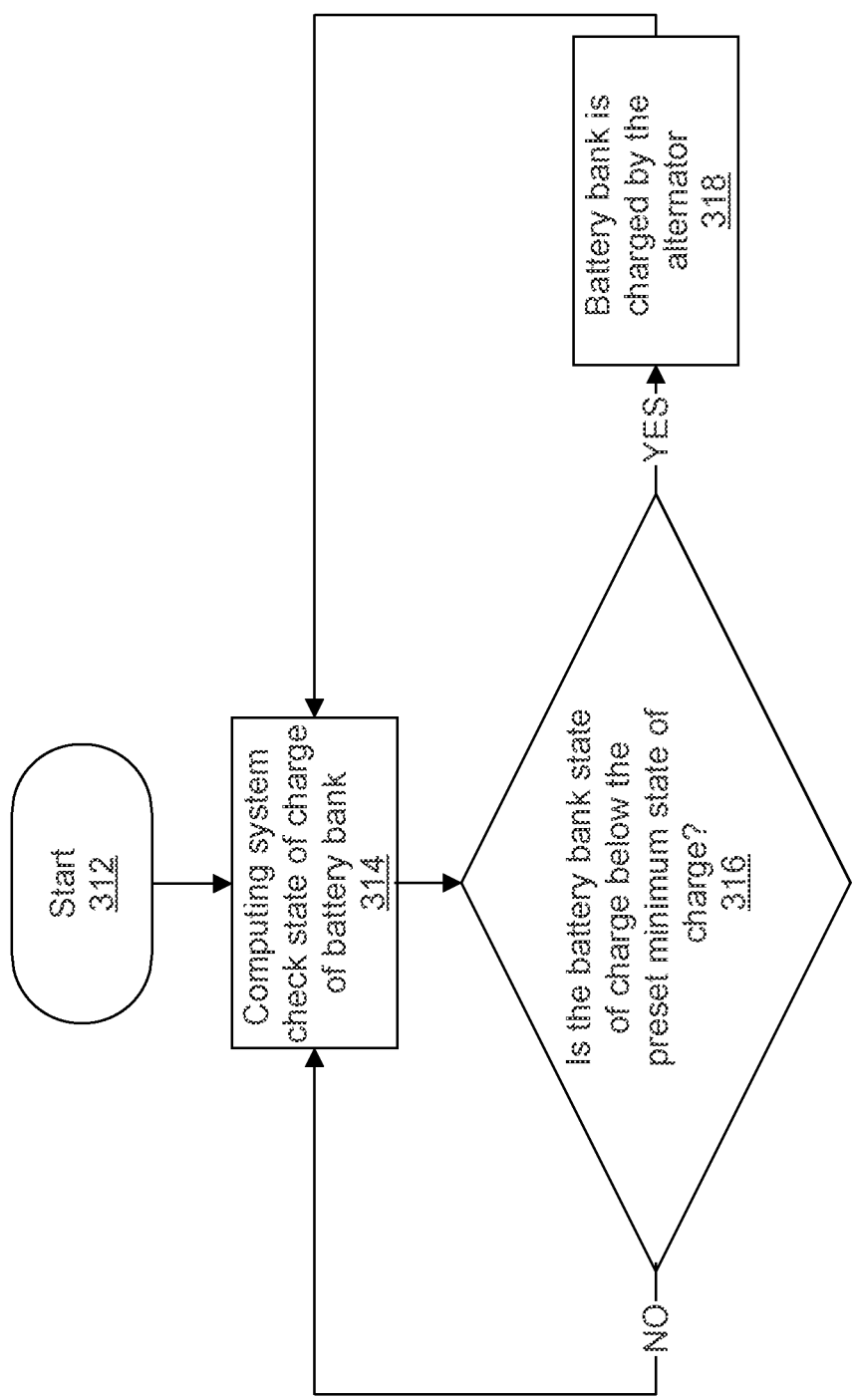
FIG. 6 illustrates a flowchart of battery regulation of an electrically driven dump system.

FIGS. 5 and 6 illustrate example flow charts 300 implementing a computing system 200 used for monitoring temperature of a motor 116 of the electrically driven dump system 100 and battery state of charge. As shown in FIG. 5, at step 302, the computing system 200 starts. Then the computing system 200 receives information from temperature sensors 208 at step 304. After the information is received, at step 306, the temperature of the motor 116 (for example) is analyzed to determine if it is above a predetermined threshold, which may be a maximum operational temperature set by a user. If it is not above the threshold, then the system returns to step 304. If the temperature for the motor 116 is above a predetermined threshold, then at step 308 the computing system stops the motor 116 via, for example, a contactor or other mechanism. The system may then proceed to step 310 where the computing system 200 sends notification to a user/administrator interface, which may be a computer, mobile phone, etc. The system then returns to step 304. Additionally, using the computing system hereinabove described, a notification may be sent to a user at any step in the flow. It will be appreciated that the notification may allow a user to take appropriate measures to ensure that the motor 116 is not damaged.

Referring to FIG. 6, at step 312, the computing system 200 starts. The computing system 200 then checks the state of charge of the battery bank at step 314. Once the state of charge is checked, at step 316, the system determines whether the battery bank state of charge is below the preset minimum state of charge. If it is not below the preset minimum, then the system returns to step 314. If it is below the preset minimum charge, then at step 318 the battery bank 108 is charged by the alternator. It will be understood that the battery bank 108 may be charged by solar power or any other mechanism, allowing charging to occur independent of the truck alternator status.

Figure 7:
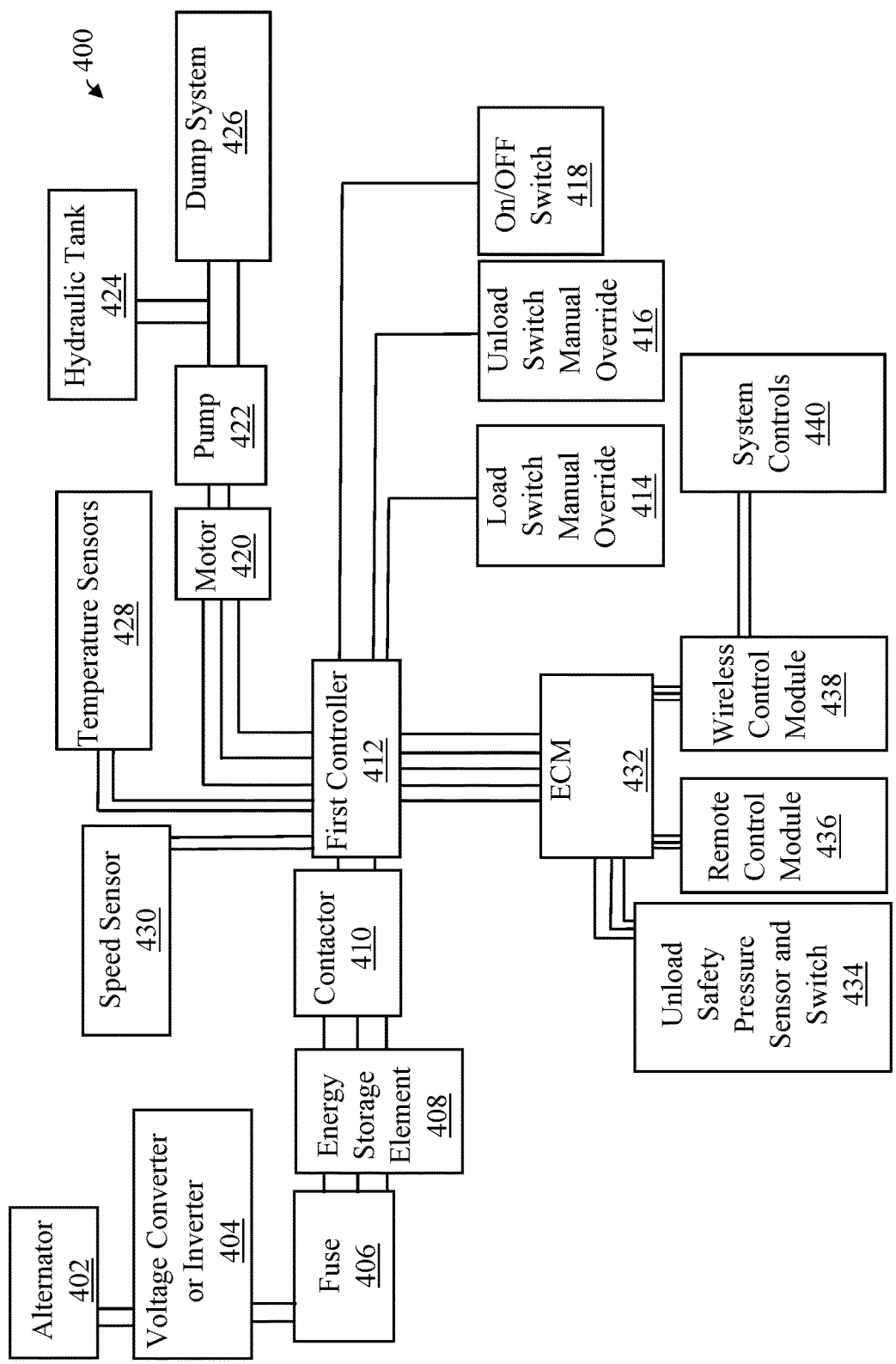
FIG. 7 illustrates a diagram of an electrically driven dump system.

FIG. 7 illustrates a block diagram of an electrically driven dump system 400. While discussed as a separate embodiment using differing Figure labels, the components and features discussed hereafter may be combined with the features hereinbefore discussed. The electrically driven dump system 400 includes an alternator 402 (e.g., semi-truck alternator) connected to a voltage converter or inverter 404. The voltage converter 404 may be a DC-to-DC voltage converter that is configured to receive input DC voltage and output increased DC voltage as described above. In an alternate embodiment, the electrically driven dump system 400 may utilize a voltage inverter that receives input DC voltage and outputs AC voltage. When using the voltage inverter, the system 400 may include an AC-to-DC charger (not shown). A fuse 406 positioned between the voltage converter 404 and an energy storage element 408 (e.g., a battery or capacitor) may prevent excessive current from traveling through the system 400. The voltage converter 404 may be configured to provide increased DC voltage to the energy storage element 408. A contactor connected to the energy storage element 408 and a first controller 412 may disconnect the system when certain sensors are activated indicating that predetermined thresholds have been exceeded.

The first controller 412 receives DC voltage from the energy storage element 408. The first controller 412 may be in communication with external controls, such as a manual load switch 414, a manual unload switch 416 to actuate the dump trailer to dump materials, and an on/off switch 418. The external controls may be positioned on or in the semi-truck or on the semi-trailer. Other digital readouts (e.g., temperature of motor, hydraulic pressure), and/or other controls for controlling the system 400 may be implemented on the external controls (collectively referred to as "external controls"). While the first controller 412 is shown as a single component, it will be appreciated that it may be separate components. Additionally, the first controller 412 is configured to convert the received DC power into AC power and provide the AC power to a motor 420 (e.g., a synchronous brushless induction motor, permanent magnet motor, or other suitable pump motor) that drives a pump 422, which may be implemented as a hydraulic pump. The pump 422 may be connected to a hydraulic tank 424 (e.g., a fluid pressure compensation system) and to a dump system 426 (e.g., a semi-trailer side dump with a hydraulic ram), which may activate the side dump from a first position (materials held upright in trailer) to a second position (materials unloaded from trailer).

Additionally, temperature sensors 428 and speed sensors 430 may be connected to the first controller 412. The temperature sensors 428 may sense the temperature of, for example, the motor 420 and the pump 422. If the temperature of the motor 420 and/or the pump 422 exceeds a predetermined threshold, which may be set by a user or administrator, the contactor 410 may disconnect power to prevent damage. Further, the speed sensors 430 may control whether the system 400 can be activated. For example, an administrator may set a maximum speed of the semi-truck at which dumping may occur, such as 5 mph. If the predetermined speed is exceeded, the dump system 426 may not unload materials. It will be appreciated that the speed sensors 430 prevent accidental unloading of materials while driving above a predetermined speed.

The first controller 412 may provide DC power to an electronic control module 432 (ECM) that is in communication with, and monitors, various components and signals. For example, the ECM 432 is in communication with an unload safety pressure sensor and switch 434, a remote control module 436, and a wireless control module 438. If pressure in the pump 422 and dump system 426 exceeds a predetermined threshold, the pressure sensor 434 may send information regarding the pressure to the ECM controller 432, which can communicate with the first controller 412 and the contactor 410 to disconnect the power, thereby preventing damage. In some embodiments, the ECM 432 may directly communicate with the contactor 410, bypassing the first controller 412. The remote control module 436 may receive communication from a handheld remote (e.g., input device 122) that may control the system 400, such as while sitting in the cab of a semi-truck or at a distance from the truck. In one embodiment, the handheld remote uses a radio transmitter to send commands to the remote control module 436.

With regard to the wireless control module 438, it may communicate with system controls 440, such as a smart device (e.g., smartphone) or other user input devices. In one embodiment, the smart device may utilize Bluetooth® to communicate with the wireless control module 438. Mobile applications may be implemented on the smart device that can control functions, such as loading and unloading. Additionally, the application may gather information relating to temperature and pressure of the motor 420 and pump 422, which information may be stored on the smart device or on the cloud. In some embodiments, the wireless control module 438 may monitor and control the entire system 400 via the smart device or other input device. The system controls 440, in some embodiments may be located on a network device or cloud-computing device, which may assist in controlling the system 400. In some embodiments, the first controller 412 and the ECM controller 432 may be combined into a single component.

Further, the system 400 may comprise a global positioning system (GPS) that may be connected to the wireless control module 438. Accordingly, an administrator or a user may program the system 400 to load or unload the dump system 426 based upon the GPS location of the semi-truck and trailer. For example, the system 400 may not be activated unless the semi-truck is at the predetermined GPS location, thereby ensuring that dumping of materials may be at the right location. In some embodiments, the electric dumping system 400 may be fully automated and use the GPS to be moved from one specific location to the next.

Those skilled in the art will recognize that certain aspects and/or components of the system for electrically driving a dump system shown and described with reference to FIGS. 1-7 may be omitted and/or replaced in some implementations. For instance, in some embodiments, the energy storage element 108 and/or charge controller is omitted from the system such that the voltage converter 102 provides increased output DC voltage directly to the controller 114 via a direct coupling therewith.

Additionally, although the foregoing disclosure has focused on semi-truck/semi-trailer dump system implementations (e.g., semi-trailer side dumps and/or end dumps), those skilled in the art will recognize that the principles described may be applied to any ground transportation vehicles/trailers, and even to subject areas that do not include dump systems. For example, a system may include a voltage converter that provides increased DC power to an energy storage element that provides DC power to a controller that converts the DC power into AC power and provides the AC power to a motor that drives/operates an aerial lift, vacuum, plow, excavator, and/or other device.

Unless defined otherwise, all technical and scientific terms used herein have the same meaning as commonly understood by one of ordinary skill in the art to which the present disclosure pertains.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. An electrically driven dump system, comprising:
   a DC-to-DC voltage converter configured to receive input DC voltage from a battery bank at a first voltage and output DC voltage at a second, increased voltage;
   an energy storage element that receives the increased DC voltage from the DC-to-DC voltage converter;
   a controller that receives DC power from the energy storage element and converts the DC power into AC power, the controller coupled to an electronic control module, a load switch manual override, an unload switch manual override, a temperature sensor, and a speed sensor; and
   a motor that receives AC power from the controller, the motor being mechanically connectable to a hydraulic pump, the hydraulic pump connectable to a hydraulic tank connectable to a dump system, such that operating the hydraulic pump actuates the dump system when the hydraulic pump is connected to the hydraulic tank and the hydraulic tank is connected to the dump system;
   an unload safety pressure sensor and switch, a remote control module, and a wireless control module all coupled to the electronic control module;
   wherein the controller may selectively activate or deactivate the motor based upon data received from the speed sensor, the temperature sensor, the load switch manual override, the unload switch manual override, or the electronic control module, the electronic control module processing information received from the unload safety pressure sensor and switch, the remote control module, and the wireless control module.

2. The electrically driven dump system of claim 1, wherein the energy storage element receives the increased DC voltage from the DC-to-DC voltage converter through a charge controller.

3. The electrically driven dump system of claim 1, wherein the battery bank is a battery bank of an electrical system of a semi-truck, and wherein the battery bank is chargeable by an alternator of the semi-truck.

4. The electrically driven dump system of claim 1, wherein the energy storage element is a second battery bank.

5. The electrically driven dump system of claim 1, wherein the dump system is a semi-trailer side dump.

6. The electrically driven dump system of claim 1, wherein the energy storage element, the controller, the motor, and the pump are mountable on a semi-trailer.

7. The electrically driven dump system of claim 1, wherein the controller provides three-phase AC power, and wherein the motor is a three-phase AC motor.

8. The electrically driven dump system of claim 1, wherein the controller wirelessly communicates with an input device, wherein the input device receives user input to selectively activate, deactivate, or change the direction of the motor.

9. The electrically driven dump system of claim 8, wherein the input device is a computing system that comprises one or more processors and one or more computer-readable hardware storage media and a user interface.

10. The electrically driven dump system of claim 1, wherein the controller communicates with a computing system that has one or more processors and one or more computer-readable hardware storage media.

11. The electrically driven dump system of claim 10, wherein the computer-readable hardware storage media include computer-executable instructions being executable by the one or more processors to cause the computing system to provide a notification on a user interface associated with the computing system in response to detecting that a reading of the speed sensor, the temperature sensor, or unload safety pressure sensor of the system has met or exceeded a predetermined threshold value.

12. The electrically driven dump system of claim 1, further comprising a cooling system in fluid communication with the motor.

* * * * *